United States Patent
Yan

(10) Patent No.: US 11,218,325 B2
(45) Date of Patent: Jan. 4, 2022

(54) ASSET MANAGEMENT METHOD AND APPARATUS, AND ELECTRONIC DEVICE

(71) Applicant: Advanced New Technologies Co., Ltd., Grand Cayman (KY)

(72) Inventor: Xuebing Yan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/725,918

(22) Filed: Dec. 23, 2019

(65) Prior Publication Data
US 2020/0136833 A1 Apr. 30, 2020

Related U.S. Application Data

(63) Continuation of application No. 16/275,505, filed on Feb. 14, 2019.

(30) Foreign Application Priority Data

Feb. 14, 2018 (CN) .......................... 201810151611.4

(51) Int. Cl.
*H04L 29/06* (2006.01)
*H04L 9/32* (2006.01)
(Continued)

(52) U.S. Cl.
CPC .......... *H04L 9/3247* (2013.01); *G06F 16/235* (2019.01); *G06F 16/27* (2019.01);
(Continued)

(58) Field of Classification Search
CPC ... H04L 9/3247; H04L 9/0866; H04L 63/102; H04L 2209/38; H04L 2209/56; G06F 16/27; G06F 16/235
See application file for complete search history.

(56) References Cited

U.S. PATENT DOCUMENTS

| 8,832,059 B2 | 9/2014 | Baran |
| 9,342,697 B1 | 5/2016 | Ren et al. |

(Continued)

FOREIGN PATENT DOCUMENTS

| CN | 106656974 | 5/2017 |
| CN | 106815764 | 6/2017 |

(Continued)

OTHER PUBLICATIONS

Chen et al., "Blockchain-based Payment Collection Supervision System using Pervasive Bitcoin Digital Wallet," Fifth International Workshop on Pervasive and Contect-Aware Middleware, Oct. 2017, 8 pages.

(Continued)

*Primary Examiner* — Tri M Tran
(74) *Attorney, Agent, or Firm* — Fish & Richardson P.C.

(57) ABSTRACT

This specification describes techniques for managing assets in a blockchain. One example method includes receiving, from a target user recorded in a distributed database of a blockchain network, a user input including a request to update a status of a target object, determining, based on a contract object, whether the target user is a member user with an update permission for the target object, the contract object being published in the blockchain network and corresponding to an asset type of the target object, wherein the target object was created using the contract object, and in response to determining that the target user has the update permission for the target object, performing a status update on the target object by using the contract object.

20 Claims, 6 Drawing Sheets

(51) Int. Cl.
  *G06F 16/23* (2019.01)
  *G06F 16/27* (2019.01)
  *H04L 9/08* (2006.01)

(52) U.S. Cl.
  CPC .......... *H04L 9/0866* (2013.01); *H04L 63/102* (2013.01); *H04L 2209/38* (2013.01); *H04L 2209/56* (2013.01)

(56) References Cited

U.S. PATENT DOCUMENTS

| | | |
|---|---|---|
| 10,102,082 B2 | 10/2018 | Cabrera et al. |
| 10,204,349 B2 | 2/2019 | McCauley et al. |
| 10,564,820 B1 | 2/2020 | Cabanero et al. |
| 10,601,665 B2 | 3/2020 | Bathen et al. |
| 10,872,077 B2 | 12/2020 | Wright |
| 2002/0109737 A1 | 8/2002 | Jaeger |
| 2003/0233370 A1 | 12/2003 | Barabas et al. |
| 2008/0320024 A1 | 12/2008 | Thirumalai et al. |
| 2014/0279942 A1 | 9/2014 | Siepmann et al. |
| 2015/0244690 A1* | 8/2015 | Mossbarger ............ H04L 9/006 713/171 |
| 2015/0262176 A1 | 9/2015 | Langschaedel et al. |
| 2015/0379510 A1 | 12/2015 | Smith |
| 2016/0012424 A1 | 1/2016 | Simon et al. |
| 2016/0151715 A1 | 6/2016 | Polansky et al. |
| 2016/0196324 A1 | 7/2016 | Haviv et al. |
| 2016/0283920 A1 | 9/2016 | Fisher et al. |
| 2016/0292672 A1 | 10/2016 | Fay et al. |
| 2017/0005804 A1 | 1/2017 | Zinder |
| 2017/0011365 A1 | 1/2017 | Fransson et al. |
| 2017/0033932 A1 | 2/2017 | Truu et al. |
| 2017/0048209 A1 | 2/2017 | Lohe et al. |
| 2017/0048235 A1 | 2/2017 | Lohe et al. |
| 2017/0103468 A1 | 4/2017 | Orsini et al. |
| 2017/0116693 A1 | 4/2017 | Rae et al. |
| 2017/0132630 A1 | 5/2017 | Castinado et al. |
| 2017/0161733 A1 | 6/2017 | Koletsky et al. |
| 2017/0221052 A1 | 8/2017 | Sheng et al. |
| 2017/0232300 A1 | 8/2017 | Tran et al. |
| 2017/0286880 A1 | 10/2017 | Wiig et al. |
| 2017/0315882 A1 | 11/2017 | Yammine et al. |
| 2017/0344987 A1 | 11/2017 | Davis et al. |
| 2017/0353309 A1 | 12/2017 | Gray |
| 2018/0005186 A1 | 1/2018 | Hunn |
| 2018/0018723 A1 | 1/2018 | Nagla et al. |
| 2018/0075527 A1 | 3/2018 | Nagla et al. |
| 2018/0089183 A1 | 3/2018 | Schwartz et al. |
| 2018/0089256 A1 | 3/2018 | Wright, Sr. |
| 2018/0089761 A1 | 3/2018 | Stradling et al. |
| 2018/0091514 A1 | 3/2018 | Schwartz et al. |
| 2018/0130158 A1* | 5/2018 | Atkinson ................ G06F 21/00 |
| 2018/0131765 A1 | 5/2018 | Puleston et al. |
| 2018/0167198 A1 | 6/2018 | Muller et al. |
| 2018/0253702 A1 | 9/2018 | Dowding |
| 2018/0309567 A1 | 10/2018 | Wooden |
| 2018/0329693 A1 | 11/2018 | Eksten et al. |
| 2018/0330342 A1 | 11/2018 | Prakash et al. |
| 2019/0013948 A1 | 1/2019 | Mercuri et al. |
| 2019/0026821 A1 | 1/2019 | Bathen et al. |
| 2019/0036778 A1 | 1/2019 | Bathen et al. |
| 2019/0036906 A1 | 1/2019 | Biyani et al. |
| 2019/0080402 A1 | 3/2019 | Molinari et al. |
| 2019/0122155 A1 | 4/2019 | Irazabal et al. |
| 2019/0147431 A1 | 5/2019 | Galebach et al. |
| 2019/0164153 A1 | 5/2019 | Agrawal et al. |
| 2019/0172298 A1 | 6/2019 | Just |
| 2019/0199531 A1 | 6/2019 | Staples et al. |
| 2019/0222567 A1 | 7/2019 | Caldera et al. |
| 2019/0228386 A1 | 7/2019 | Onnainty |
| 2019/0236598 A1 | 8/2019 | Padmanabhan |
| 2019/0236606 A1 | 8/2019 | Padmanabhan et al. |
| 2019/0238316 A1 | 8/2019 | Padmanabhan |
| 2019/0238525 A1 | 8/2019 | Padmanabhan et al. |
| 2019/0251075 A1 | 8/2019 | Yan |
| 2019/0251076 A1 | 8/2019 | Yan |
| 2019/0251078 A1 | 8/2019 | Yan |
| 2019/0251079 A1 | 8/2019 | Yan |
| 2019/0251563 A1 | 8/2019 | Yan |
| 2019/0253257 A1 | 8/2019 | Yan |
| 2019/0288854 A1* | 9/2019 | Xie ...................... H04L 9/3218 |
| 2019/0303579 A1 | 10/2019 | Reddy et al. |
| 2019/0377806 A1 | 12/2019 | Padmanabhan et al. |
| 2020/0034127 A1 | 1/2020 | Burrowes et al. |
| 2020/0037158 A1 | 1/2020 | Soundararajan et al. |
| 2020/0051176 A1 | 2/2020 | Liu et al. |

FOREIGN PATENT DOCUMENTS

| | | |
|---|---|---|
| CN | 106845960 | 6/2017 |
| CN | 106874087 | 6/2017 |
| CN | 107145768 | 9/2017 |
| CN | 107220820 | 9/2017 |
| CN | 107239940 | 10/2017 |
| CN | 107273759 | 10/2017 |
| CN | 107301536 | 10/2017 |
| CN | 107615317 | 1/2018 |
| JP | 2009181553 | 8/2009 |
| JP | 2010050760 | 3/2010 |
| JP | 2013069283 | 4/2013 |
| JP | 2016139230 | 8/2016 |
| TW | M543413 | 6/2017 |
| TW | 201732666 | 9/2017 |
| TW | 201732705 | 9/2017 |
| TW | 201732706 | 9/2017 |
| TW | 201741955 | 12/2017 |
| TW | 201800997 | 1/2018 |
| TW | M555500 | 2/2018 |
| WO | WO 2017091530 | 6/2017 |
| WO | WO 2017190175 | 11/2017 |
| WO | WO 2017223470 | 12/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.
International Search Report and Written Opinion in International Application No. PCT/US2019/017946, dated May 7, 2019, 11 pages.
International Search Report and Written Opinion in International Application No. PCT/US2019/017951, dated May 14, 2019, 7 pages.
International Search Report and Written Opinion in International Application No. PCT/US2019/017956, dated May 14, 2019, 7 pages.
International Search Report and Written Opinion in International Application No. PCT/US2019/017958, dated May 1, 2019, 8 pages.
International Search Report and Written Opinion in International Application No. PCT/US2019/017980, dated May 2, 2019, 9 pages.
International Search Report and Written Opinion in International Application No. PCT/US2019/017986, dated May 1, 2019, 9 pages.
Nakamoto, "Bitcoin: A Peer-to-Peer Electronic Cash System," www.bitcoin.org, 2005, 9 pages.
binance.vision [online], "Proof of Burn Explained", Binance Academy, 2017, retrieved on Feb. 23, 2020, retrieved from URL <https://www.binance.vision/ja/blockchain/proof-of-burn-explained>, 7 pages (with partial English translation).
U.S. Appl. No. 16/275,403, Yan, filed Feb. 14, 2019.
U.S. Appl. No. 16/724,642, Yan, filed Dec. 23, 2019.
U.S. Appl. No. 16/275,440, Yan, filed Feb. 14, 2019.
U.S. Appl. No. 16/725,236, Yan, filed Dec. 23, 2019.
U.S. Appl. No. 16/275,444, Yan, filed Feb. 14, 2019.
U.S. Appl. No. 16/724,785, Yan, filed Dec. 23, 2019.
U.S. Appl. No. 16/275,811, Yan, filed Feb. 14, 2019.
U.S. Appl. No. 16/723,313, Yan, filed Dec. 20, 2019.
U.S. Appl. No. 16/275,868, Yan, filed Feb. 14, 2019.
U.S. Appl. No. 16/725,686, Yan, filed Dec. 23, 2019.
PCT International Preliminary Report on Patentability in International Application No. PCT/US2019/017958, dated Aug. 27, 2020, 7 pages.

(56) References Cited

OTHER PUBLICATIONS

Ogami et al., "A Proposal of Reliable Car Sharing System Using Ethereum's Smart Contract," Information and Communication Engineers, The Institute of Electronics, May 24, 2017, vol. 117, No. 69, p. 37-40, ISSN: 0913-5685 (with English abstract).
Sachiko Yoshihama et al., "Blockchain Technology and IBM Efforts," PROVISION 2017, IBM Japan Ltd., Feb. 23, 2017, No. 91, p. 34-39 (with machine English translation).
Yoshihama et al., "Protection of Integrity and Privacy on Distributed Ledger Technologies," Oct. 2017, Computer Security Symposium 2017, vol. 2017, No. 2 [CD-ROM], p. 680-687 (with English abstract).
ibm.com [online], "The difference between public and private blockchain," May 31, 2017, retrieved on October 19, 2021, retrieved from URL <https://www.ibm.com/blogs/blockchain/2017/05/the-difference-between-public-and-private-blockchain/>, 5 pages.

\* cited by examiner

ASSET MANAGEMENT METHOD AND APPARATUS, AND ELECTRONIC DEVICE

CROSS-REFERENCE TO RELATED APPLICATIONS

This application is a continuation of U.S. application Ser. No. 16/275,505, filed on Feb. 14, 2019, which claims priority to Chinese Patent Application No. 201810151611.4, filed on Feb. 14, 2018, each of which is hereby incorporated by reference in its entirety.

TECHNICAL FIELD

One or more implementations of the present specification relate to the field of blockchain technologies, and in particular, to an asset management method and apparatus, and an electronic device.

BACKGROUND

A blockchain technology is an emerging technology that some computing devices jointly participate in "accounting" to maintain a complete distributed database. The blockchain technology features decentralization and transparency, each computing device can record data in the database, and the data can be synchronized rapidly between the computing devices. Therefore, using the blockchain technology to create a decentralized system and record various execution programs in a distributed database in a blockchain for automatic execution has been widely applied to many fields. For example, in the financial technology field, the blockchain technology is used to create a P2P payment platform and publish execution programs such as a smart contract in a blockchain, so that peer-to-peer security payment between different users can be implemented without the help of financial institutions such as a bank.

SUMMARY

The present specification provides an asset management method, including: receiving, by a node device in a blockchain, a status update request initiated by a target user for a target asset object; in response to the status update request, verifying whether the target user is a member user with update permission for the target asset object in a smart contract object that is published in the blockchain and corresponds to an asset type of the target asset object, where the target asset object is created by invoking the smart contract object; and performing status update on the target asset object by invoking the smart contract object if the target user is a member user with update permission for the target asset object in the smart contract object.

The present specification further provides an asset management method, including: receiving, by a node device in a blockchain, a status update request initiated by a target user for a target asset object; in response to the status update request, verifying whether the target user is a publisher of a smart contract object that is published in the blockchain and corresponds to an asset type of the target asset object, where the target asset object is created by invoking the smart contract object; and performing status update on the target asset object by invoking the smart contract object if the target user is a member user who publishes the smart contract object.

The present specification further provides an asset management apparatus, including: a first receiving module, configured to receive a status update request initiated by a target user for a target asset object; a first verification module, configured to verify, in response to the status update request, whether the target user is a member user with update permission for the target asset object in a smart contract object that is published in a blockchain and corresponds to an asset type of the target asset object, where the target asset object is created by invoking the smart contract object; and a first updating module, configured to perform status update on the target asset object by invoking the smart contract object if the target user is a member user with update permission for the target asset object in the smart contract object.

The present specification further provides an asset management apparatus, including: a second receiving module, configured to receive a status update request initiated by a target user for a target asset object; a second verification module, configured to verify, in response to the status update request, whether the target user is a publisher of a smart contract object that is published in a blockchain and corresponds to an asset type of the target asset object, where the target asset object is created by invoking the smart contract object; and a second updating module, configured to perform status update on the target asset object by invoking the smart contract object if the target user is a member user who publishes the smart contract object.

The present specification further provides an electronic device, including: a processor; and a memory, configured to store a machine executable instruction, where by reading and executing the machine executable instruction that is stored in the memory and corresponds to control logic of blockchain-based asset management, the processor performs the following operations: receiving, by a node device in a blockchain, a status update request initiated by a target user for a target asset object; in response to the status update request, verifying whether the target user is a member user with update permission for the target asset object in a smart contract object that is published in the blockchain and corresponds to an asset type of the target asset object; and performing status update on the target asset object by invoking the smart contract object if the target user is a member user with update permission for the target asset object in the smart contract object.

The present specification further provides an electronic device, including: a processor; and a memory, configured to store a machine executable instruction, where by reading and executing the machine executable instruction that is stored in the memory and corresponds to control logic of blockchain-based asset management, the processor performs the following operations: receiving a status update request initiated by a target user for a target asset object; in response to the status update request, verifying whether the target user is a publisher of a smart contract object that is published in a blockchain and corresponds to an asset type of the target asset object; and performing status update on the target asset object by invoking the smart contract object if the target user is a member user who publishes the smart contract object.

In the previous implementations, the status update permission for the target asset object published in the blockchain can be strictly controlled, so that the status update permission is granted only to the publishers of the smart contract objects, or a user group stated by the publisher can update the target asset object. As such, when an asset object is transferred, and a holder of the asset object changes for a plurality of times, some new holders without update permission cannot perform improper status updates on the asset object, thereby improving the security level for asset object management.

DESCRIPTION OF IMPLEMENTATIONS

The present specification is intended to disclose the following technical solutions: In a blockchain, an asset object published in the blockchain is managed by using a smart contract object, and a publisher of the smart contract object or a user group designated by the publisher of the smart contract object in the smart contract object completes status update of the asset object.

A target member in a blockchain can publish a smart contract object (a smart contract) corresponding to an asset type of an asset object in the blockchain in advance. The created smart contract object is used to manage the asset object. A user accessing the blockchain can create an asset object in the blockchain and perform status update on the created asset object by invoking the smart contract object.

When a target user accessing the blockchain requests to perform status update on a target asset object created by invoking the smart contract object, the target user can initiate a status update request for the target asset object to the blockchain.

When receiving the status update request, a node device in the blockchain can verify whether the target user is a publisher of the smart contract object, and can perform status update on the target asset object by invoking the smart contract object if the target user is a publisher of the smart contract object. For example, an execution program used to perform status update on an asset object created by invoking the smart contract object can be stated in the smart contract object in advance. In this case, status update can be performed on the target asset object by invoking the execution program used to perform status update on a created asset object.

In addition, the publisher of the smart contract object can state, in the smart contract object, a member user with update permission for the target asset object created by invoking the smart contract object. When receiving the status update request, the node device in the blockchain can verify whether the target user is a member user with update permission for the target asset object in the smart contract object, and can perform status update on the target asset object by invoking the smart contract object if the target user is a member user with update permission.

In the previous implementations, the status update permission for the target asset object published in the blockchain can be strictly controlled, so that the status update permission is granted only to the publishers (target users) of the smart contract objects, or a user group stated by the publisher can update the target asset object. As such, when a holder of an asset object changes, some new holders without update permission cannot perform improper status updates on the asset object, thereby improving the security level for asset object management.

The present specification is described below by using specific implementations based on specific application scenarios.

Figure 1:
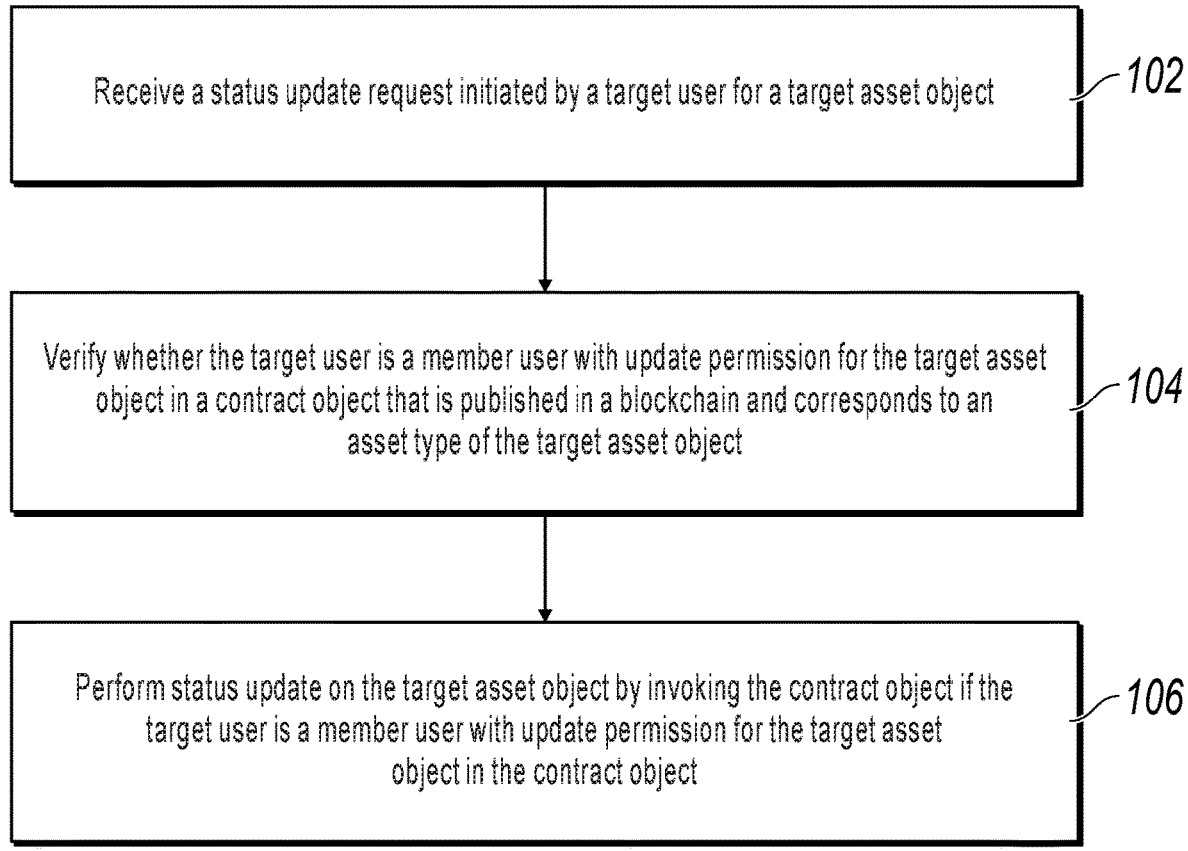
FIG. 1 is a flowchart illustrating an asset management method, according to an example implementation.

FIG. 1 illustrates an asset management method, according to an implementation of the present specification. The asset management method is applied to a node device in a blockchain, and the node device performs the following steps:

Step 102: The node device in the blockchain receives a status update request initiated by a target user for a target asset object.

Step 104: In response to the status update request, verify whether the target user is a member user with update permission for the target asset object in a smart contract object that is published in the blockchain and corresponds to an asset type of the target asset object, where the target asset object is created by invoking the smart contract object.

Step 106: Perform status update on the target asset object by invoking the smart contract object if the target user is a member user with update permission for the target asset object in the smart contract object.

Based on the same concept, the present specification further provides another asset management method.

Figure 2:
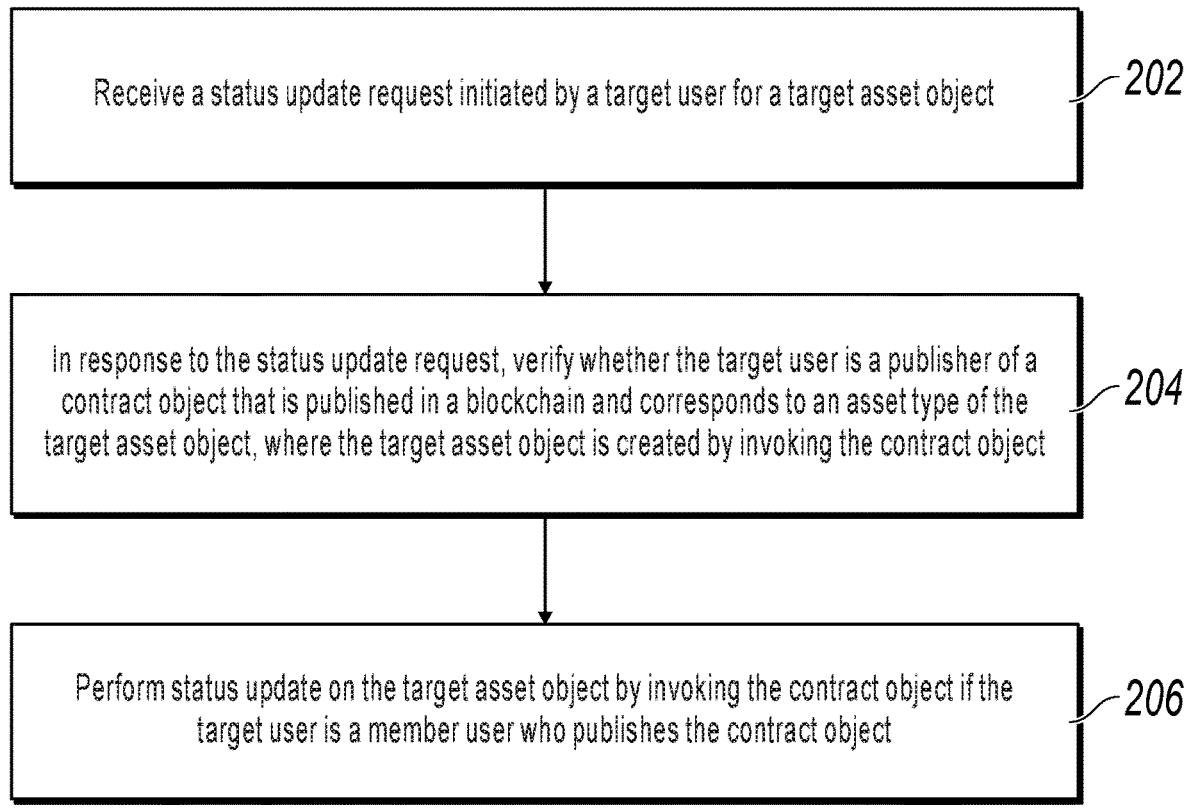
FIG. 2 is a flowchart illustrating another asset management method, according to an example implementation.

FIG. 2 illustrates an asset management method, according to an implementation of the present specification. The asset management method is applied to a node device in a blockchain, and the node device performs the following steps:

Step 202: The node device in the blockchain receives a status update request initiated by a target user for a target asset object.

Step 204: In response to the status update request, verify whether the target user is a publisher of a smart contract object that is published in the blockchain and corresponds to an asset type of the target asset object, where the target asset object is created by invoking the smart contract object.

Step 206: Perform status update on the target asset object by invoking the smart contract object if the target user is a member user who publishes the smart contract object.

The blockchain described in the present specification can include any type of blockchain network that can also support an asset object.

For example, a conventional blockchain usually supports only an account object and a smart contract object, but in the present specification, the blockchain can support more objects. The blockchain can support an asset object in addition to an account object, a smart contract object that are currently supported.

It is worthwhile to note that a type of the blockchain described in the present specification is not limited, and the blockchain can be a consortium blockchain, or can be a type of blockchain (for example, a private blockchain or a public blockchain) other than the consortium blockchain.

The smart contract object can include a smart contract program that a target member in the blockchain publishes in the blockchain, and the smart contract program is recorded in a distributed database (namely, a blockchain ledger) in the blockchain, and is used to manage asset objects supported by the blockchain. A user accessing the blockchain can create an asset object in the blockchain by invoking the smart contract object, and manage the held asset object online in the blockchain.

For example, the blockchain can be a consortium blockchain including some financial institutions that serve as consortium members. In this case, the target member in the blockchain can be a financial institution serving as a consortium member with asset object creation permission in the consortium blockchain. A distributed smart contract platform can be created by using the consortium blockchain. An operator of the smart contract platform can extend object types supported by the smart contract platform, to support an asset object in addition to an account object, a smart contract object that are currently supported, so that the financial institution serving as a consortium member can create a new asset type in the platform by publishing a smart contract (a smart contract object) in the blockchain. As such, a user accessing the blockchain can create an asset object by invoking the smart contract, manage the held asset object online, and perform asset status update on the created asset object.

It is worthwhile to note that in the present specification, a type of a request initiated by the user accessing the blockchain in the blockchain can be a transaction (transaction) used in the conventional blockchain.

For example, the user accessing the blockchain can initiate a transaction used to create an asset object in the blockchain, to create an asset object by invoking the smart contract object published in the blockchain, or can initiate a transaction used to perform status update on an asset object in the blockchain, to perform status update on a created asset object.

In some implementations, the type of the request initiated by the user accessing the blockchain in the blockchain can be a form of instruction, message, etc. with a standard data structure other than the transaction. The type of the request is not limited in the present specification. The following implementations provide descriptions by using an example that the request initiated by the user accessing the blockchain in the blockchain is a transaction.

The asset object can include a smart asset object. The smart asset object is used to maintain a smart asset. The smart asset corresponds to any type of real asset of a user, and the smart asset can be processed in the blockchain by using the smart asset object. For example, the smart asset object is processed by using a smart contract in the blockchain. A type of the user's real asset corresponding to the smart asset is not limited in the present specification.

For example, the blockchain is a consortium blockchain including some financial institutions. In actual applications, any form of a user's offline asset, for example, funds, real estates, stocks, loan contracts, bills, or payment receivables, can be converted into a digital asset by a financial institution that manages a node device in the consortium blockchain, and the digital asset is published in a distributed database in the consortium blockchain after being created.

The technical solutions of the present specification are described below in detail by using specific implementations with reference to "blockchain object extension", "smart contract object publication", "asset object creation", "asset object transfer", and "asset object status update".

(1) Blockchain Object Extension

In the present specification, an operator of the blockchain can extend objects supported by the blockchain when creating a blockchain network.

In a conventional blockchain (for example, Ethereum), objects supported by the blockchain usually include only two types: an account object and a smart contract object. However, in the present specification, the objects supported by the blockchain can be extended, and an asset object is supported in addition to an existing account object and smart contract object.

In other words, in the present specification, the objects supported by the blockchain can include three types: an account object, a smart contract object, and an asset object. As such, in addition to creating an account and a smart contract in the blockchain, a user accessing the blockchain can create a digital asset in the blockchain. Therefore, a real asset can be converted into a digital asset published in the blockchain.

In an implementation, the object supported by the blockchain can still include the following four attribute fields: a balance field (address field), a storage field (status field), a code field, and a nonce field.

In a conventional blockchain (for example, Ethereum), the balance field usually indicates "balance", and is used to indicate the number of tokens held by an object. However, in the present specification, the meaning of the balance field can be extended, so that the balance field is used to maintain address information of an asset object held by an object instead of indicating "balance". In actual applications, the balance field can be used to maintain address information of a plurality of asset objects.

For each of the account object, the smart contract object, and the asset object that are previously described, address information of an asset object can be added to a balance field, so that the asset object corresponding to the address information can be held. In other words, in the present specification, in addition to the account object and the smart contract object that are previously described, the asset object can also hold a virtual asset.

The storage field is used to maintain various statuses of an object (for example, an account status, a contract status, and an asset status). In an example of an asset object, a financial institution that publishes the asset object or another executor that has update permission for the asset object and is designated by the financial institution can update a status of the asset object by modifying content in a storage field. For example, the asset object is a digital asset converted from an offline loan contract asset of a user. When a regular loan repayment status of the user changes, a financial institution that publishes the asset object or another executor that has update permission for the asset object and is designated by the financial institution can perform, based on a change of the regular loan repayment status of the user, synchronous update on content in a storage field in an asset object corresponding to the digital asset.

The code field is used to maintain execution code (for example, various code-related executable methods) related to an execution program stated in an object. In other words, in the present specification, related execution programs can be stated in the account object, the smart contract object, and the asset object that are previously described.

A smart contract object used to manage an asset object is used as an example. Any form of operation related to the asset object managed by using the smart contract object can be stated in a code field in the smart contract object in the form of execution programs in advance, and corresponding operations can be subsequently completed by directly invoking these execution programs. For example, execution programs stated in the smart contract object used to manage asset objects can usually include an execution program used to create an asset object, an execution program used to update an asset object, an execution program used to transfer an asset object, etc.

It is worthwhile to note that in addition to the execution code related to the execution program stated in the object, the code field can be further used to maintain an invoking address of a smart contract object, an invoking parameter that requests to be transferred during invoking of the smart contract object, etc.

The nonce field is used to maintain a count used to protect a blockchain from a replay attack. The count can usually be a random number or a pseudo-random number used to protect a blockchain from a replay attack.

(2) Smart Contract Object Publication

In an implementation, the blockchain can be a consortium blockchain including some financial institutions that serve as consortium members. In this case, a target member in the blockchain can be a financial institution serving as a consortium member with asset object creation permission in the consortium blockchain.

A distributed smart contract platform can be created by using the consortium blockchain. The financial institution with asset object creation permission in the consortium blockchain can create a new asset type in the platform by publishing a smart contract (a smart contract object) in the consortium blockchain.

Each financial institution in the consortium blockchain can first register as a consortium member in the consortium blockchain, and obtain a pair of keys: a public key and a private key returned by the consortium blockchain. The public key is used as an account address of each financial institution in the consortium blockchain, and the private key is used as a unique key for operating the account by each financial institution. An operator of the consortium blockchain can grant asset object creation permission to the financial institutions that join the consortium blockchain. After obtaining the asset object creation permission, the financial institution can create and publish a smart contract in the consortium blockchain, and create a new asset type based on actual requests.

A detailed process of publishing a smart contract by the financial institution in the consortium blockchain is not described in detail in the present specification, and a person of ordinary skill in the art can refer to descriptions in related technologies.

For example, in actual applications, the financial institution can publish a created smart contract in the consortium blockchain by publishing a transaction in the consortium blockchain based on the held private key. When receiving, by using a node device managed by the financial institution, a transaction published by another financial institution, each consortium member in the consortium blockchain can perform consensus processing on transactions published recently in the consortium blockchain based on a consensus algorithm in the consortium blockchain, and record a smart contract published by using the transaction in a distributed database in the consortium blockchain after consensus processing is completed. The consensus algorithm supported by the consortium blockchain and a consensus processing process performed in the consortium blockchain based on the consensus algorithm are not described in detail in the present specification, and a person of ordinary skill in the art can refer to descriptions in related technologies.

In the present specification, an execution program related to an asset type corresponding to the smart contract can be stated in advance in the smart contract that is published by the financial institution in the consortium blockchain and corresponds to the new asset type. The execution program stated in advance can be included in a code field in a smart contract object corresponding to the smart contract.

In an implementation, execution programs stated in the smart contract that is published by the financial institution in the consortium blockchain and corresponds to the new asset type can include an execution program used to create an asset object and an execution program used to transfer an asset object. A user accessing the consortium blockchain can publish, in the consortium blockchain by invoking an API interface provided by the consortium blockchain, a transaction that is signed based on a held private key, and create a virtual asset and complete online transfer of the held virtual asset by invoking the execution programs stated in the smart contract.

In some implementations, in addition to the execution program used to create an asset object and the execution program used to transfer an asset object that are previously described, the execution programs stated in the smart contract that is published by the financial institution in the consortium blockchain and corresponds to the new asset type can also include other execution programs related to an asset object, for example, an execution program used to update an asset object. The other execution programs are not listed one by one in the present specification.

(3) Asset Object Creation

In the present specification, a user who requests to access the blockchain can register with the consortium blockchain in advance, and obtain a pair of keys: a public key and a private key returned by the consortium blockchain. After registration is completed, the consortium blockchain can create a corresponding account object for the user.

A registered user can publish a transaction in the consortium blockchain by using the API interface provided by the consortium blockchain, and the transaction is used to request to create an asset object and is signed based on a held private key.

After receiving the transaction that is published by the registered user based on the private key, a node device corresponding to the user in the consortium blockchain can first perform identity authentication on the user based on a public key corresponding to the private key held by the user. For example, in actual applications, the user can sign the initiated transaction based on the held private key, and the node device in the blockchain performs authentication on a signature based on the public key corresponding to the private key held by the user. If signature authentication succeeds, identity authentication on the user succeeds.

After identity authentication succeeds, consensus processing can be performed on transactions received within a time period based on the consensus algorithm. After consensus processing is completed, the transaction can be executed to determine a type of the asset object that the user requests to create (a plurality of smart contract objects corresponding to different types of asset objects can be published in the consortium blockchain, and the user can request to create a particular type of asset object).

For example, in an implementation, the type of the asset object that the user requests to create can be stated in the transaction that is published by the user based on the held private key. The node device that receives the transaction can determine the type of the asset object that the user requests to create based on the information stated in the transaction.

After determining the type of the asset object that the user requests to create, the node device can further query a smart contract object that is published in the consortium blockchain and corresponds to the type of the asset object requested by the user, and then create the asset object by invoking, based on an invoking address of the smart contract object, an execution program in the smart contract object that is used to create an asset object.

For example, in an implementation, the transaction that is published by the user based on the held private key can further include parameters related to the asset object that the user requests to create, for example, the amount of assets that the user requests to create. When invoking the smart contract object, the node device can use these parameters as invoking parameters, and transfer these parameters to the execution program in the smart contract object that is used to create an asset object, so as to create the asset object using the execution program.

In an implementation, after the asset object is created for the user through the previous process, the node device can further add address information of the created asset object to a balance field in a target object that holds the asset object.

A process of generating the address information of the asset object is not limited in the present specification. For example, in an implementation, the address information of the asset object can be a hash value obtained by performing hash calculation on content of the transaction that requests to create the asset object.

In an implementation, there are the following two cases for the target object that eventually holds the created asset object.

In one case, the target object that eventually holds the created asset object can be a target object that is designated by the user and is used to hold the asset object.

For example, the user can state in advance the target object that can hold the new asset object in the published transaction that requests to create the asset object. Or the user can notify the designated target object that holds the created asset object to a financial institution that publishes the asset object through offline notification.

In the other case, the target object that eventually holds the created asset object can be a target object that is stated in the smart contract object in advance and is used to hold the asset object. In other words, when publishing the smart contract object, the financial institution can state, in the smart contract object in advance, the target object that can hold the asset object created by invoking the smart contract object.

For example, when publishing the smart contract object, the financial institution can state, in the smart contract object in advance, a whitelist of target objects that can hold the asset object created by invoking the smart contract object. Only a target object in the whitelist can hold the asset object created by invoking the smart contract object.

In an implementation, the asset object that can eventually hold the created asset object can be any one of the account object, the smart contract object, and the asset object supported by the consortium blockchain. In other words, in the present specification, each of the account object, the smart contract object, and the asset object supported by the consortium blockchain can hold the asset object. The created asset object can be held by any one of the account object, the smart contract object, and the asset object that is designated by the user or stated in the smart contract object.

For example, the user can designate asset object A as a target object that holds created asset object B, and then add address information of asset object B to a balance field in asset object A, to perform packeting of asset object A and asset object B.

(4) Asset Object Transfer

In the present specification, in actual applications, the registered user not only can publish, in the consortium blockchain by using the API interface provided by the consortium blockchain, the transaction that is used to request to create an asset object and is signed based on the held private key, to create an asset object, but also can publish, in the consortium blockchain by using the API interface, a transaction that is used to transfer an asset object and is signed based on the held private key.

After receiving the transaction that is published by the registered user based on the private key, the node device corresponding to the user in the consortium blockchain can first perform identity authentication on the user based on the public key corresponding to the private key held by the user. After identity authentication succeeds, consensus processing can be performed on transactions received within a time period based on the consensus algorithm. After consensus processing is completed, the transaction can be executed to determine a target asset object that the user requests to transfer.

For example, in an implementation, address information or another type of identification information of the asset object that the user requests to transfer can be stated in the transaction that is published by the user based on the held private key. The node device that receives the transaction can determine the target asset object that the user requests to transfer based on the information stated in the transaction.

After determining the target asset object that the user requests to transfer, the node device can remove the address information of the target asset object from a balance field in a target object that holds the target asset object, and adds the address information of the target asset object to a balance field in an asset receiver object corresponding to the target asset object.

It is worthwhile to note that in the present specification, the user can transfer the held asset object in the consortium blockchain by initiating the transaction in the following two ways.

In one implementation, a transaction type used to transfer a virtual asset can be specified in the consortium blockchain. The user can transfer the asset object in the consortium blockchain by initiating the specified transaction type used to transfer a virtual asset in the consortium blockchain without invoking a smart contract object. A node device that executes this type of transaction removes the address information of the target asset object from the balance field in the target object that holds the target asset object, and adds the address information of the target asset object to the balance field in the asset receiver object corresponding to the target asset object.

In the other implementation, the user can transfer the asset object by invoking a smart contract object corresponding to an asset type of the asset object. In this case, an execution program used to transfer an asset object can be stated in the smart contract object in advance, and a transfer rule is pre-specified in the execution program.

The transfer rule can be some asset transfer conditions stated in the smart contract object. Specific content of the asset transfer conditions can be customized by a person of ordinary skill in the art based on actual requirements. For example, the asset transfer conditions can be that the asset object can be transferred only when the user who initiates the transaction belongs to a designated user group stated in the smart contract object.

Execution logic corresponding to the execution program used to transfer an asset object is not limited in the present specification, and can be customized by a person of ordinary skill in the art based on actual requirements. For example, in some situations, the execution program can be execution code stated in a code field in the smart contract object in advance, for example, an asset transfer condition.

When the user requests to transfer, in the consortium blockchain, the asset object created by invoking the smart contract, the user can initiate a transaction that is used to transfer an asset object to the smart contract object in the consortium blockchain, and the transaction is used as input of the smart contract object. The execution program in the smart contract object that is used to transfer an asset object is invoked based on an invoking address of the smart contract object corresponding to the target asset object, to determine whether the transaction that is initiated by the user to transfer an asset object satisfies the transfer rule specified in the execution program. If the transfer rule is satisfied, the node device can remove the address information of the target asset object from the balance field in the target object that holds the target asset object, and add the address information of the target asset object to the balance field in the asset receiver object corresponding to the target asset object.

In an implementation, there are the following two cases for the asset receiver object corresponding to the target asset object.

In one case, the asset receiver object corresponding to the target asset object can be an asset receiver object that is designated by the user and corresponds to the target asset object.

For example, the user can state in advance the asset receiver object corresponding to the target asset object in the published transaction that requests to transfer an asset object. Or the user can notify the designated asset receiver object corresponding to the target asset object to a financial institution that publishes the asset object through offline notification.

In the other case, the asset receiver object corresponding to the target asset object can be an asset receiver object that is stated in the smart contract object in advance and corresponds to the target asset object. In other words, when publishing the smart contract object, the financial institution can state, in the smart contract object in advance, the receiver object that can hold the asset object created by invoking the smart contract object during transfer of the asset object.

In an implementation, the asset receiver object corresponding to the target asset object can include any one of the account object, the smart contract object, and the asset object supported by the consortium blockchain. In other words, in the present specification, the target asset object to be transferred can be transferred to any one of the account object, the smart contract object, and the asset object supported by the consortium blockchain.

(5) Asset Object Status Update

In the present specification, in actual applications, the registered user not only can publish, in the consortium blockchain by using the API interface provided by the consortium blockchain, the transaction used to request to create an asset object and the transaction used to transfer an asset object that are signed based on the held private key, to create an asset object and transfer an asset object, but also can publish, in the consortium blockchain by using the API interface, a transaction that is used to perform status update on a created target asset object and is signed based on the held private key.

After receiving the transaction that is published by the registered user based on the private key, the node device corresponding to the user in the consortium blockchain can first perform identity authentication on the user based on the public key corresponding to the private key held by the user. After identity authentication succeeds, consensus processing can be performed on transactions received within a time period based on the consensus algorithm. After consensus processing is completed, the transaction can be executed to perform permission authentication on the user, so as to determine whether the user has status update permission for the target asset object.

In the present specification, a member user with status update permission for the target asset object can be a publisher of the smart contract object, or can be a member user who has update permission and is stated by the publisher of the smart contract object in the smart contract object.

The following separately describes the previous two cases.

In one scenario, when executing the transaction that is initiated by the user to perform status update for the created target asset object, to perform permission authentication on the user, the node device in the blockchain can verify whether the user is a publisher of the smart contract object (namely, a smart contract object that is invoked to create the target asset object). If the user is a publisher of the smart contract object, the user has status update permission for the target asset object by default.

In an implementation, an authentication program corresponding to a publisher identity of the smart contract object can be stated by the publisher of the smart contract object in the smart contract object. The authentication program is used to verify whether the user who initiates the status update of the target asset object is a publisher of the smart contract object.

In this case, when executing the transaction that is initiated by the user to perform status update on the created target asset object, to perform permission authentication on the user, the node device can further perform identity authentication on the user by invoking the authentication program stated in the smart contract object based on an invoking address of the smart contract object corresponding to the target asset object, and determine that the user is a publisher of the smart contract object if authentication succeeds.

It is worthwhile to note that specific authentication logic in the authentication program that is used to verify whether the user is a publisher of the smart contract object is not limited in the present specification, and can be customized by a person of ordinary skill in the art based on actual service demands in actual applications.

For example, the authentication logic in the authentication program can be verifying whether an identity of a publisher of the transaction submitted in the transaction matches the identity of the publisher of the smart contract object, or whether an identity of a publisher of the transaction matches a coding rule of the identity of the publisher of the smart contract object. The previous example is merely an example, and is not used for limitation.

In an implementation, a user list of publishers of the smart contract object can be stated in the smart contract object. The smart contract object can be published by one member user in the blockchain or can be jointly published by a plurality of member users. Therefore, the user list can include one or more publishers of the smart contract object.

In this case, when executing the transaction that is initiated by the user to perform status update on the created target asset object, to perform permission authentication on the user, the node device can further verify whether the user matches a member user in the user list, and determine that the user is a publisher of the smart contract object if the user matches a member user in the user list.

In an implementation, the user list of publishers of the smart contract object that is stated in the smart contract object can be a public key list of the publishers of the smart contract object. The user list can include information about public keys held by the publishers.

In this case, because the transaction that is submitted by the user to perform status update on the target asset object is signed in advance based on the private key held by the user, when matching the user with a member user in the user list, the node device can perform authentication on a signature of the transaction based on the public key in the public key list. If authentication succeeds, the user matches a member user in the user list, and the user is a publisher of the smart contract object.

In some implementations, to match the user with a member user in the user list, the node device not only can perform authentication on the signature of the transaction initiated by the user based on the public key of the publisher, but also can use other methods. For example, the user list can be an identity list of the publishers of the smart contract object, and the transaction submitted by the user can include a user identity of the user who initiates the transaction. In this case, whether the user who initiates the transaction is a publisher of the smart contract object can be determined by matching user identities. The other methods are not listed one by one in the present specification.

In the present specification, if the user is a publisher of the smart contract object, status update can be performed on the target asset object by invoking, based on an invoking address of the smart contract object corresponding to the target asset object, an execution program in the smart contract object that is used to perform status update on the target asset object.

In the other scenario, when executing the transaction that is initiated by the user to perform status update on the created target asset object, to perform permission authentication on the user, the node device in the blockchain can verify whether the user is a publisher of the smart contract object, namely, a member user with update permission for the target asset object in the smart contract object. If the user is a member user who has update permission and is stated by the publisher of the smart contract object in the smart contract object, the user has update permission for the target asset object.

In an implementation, an authentication program corresponding to the update permission for the target asset object can be stated by the publisher of the smart contract object. The authentication program is used to verify whether the user who initiates the status update of the target asset object has update permission for the target asset object.

In this case, when executing the transaction that is initiated by the user to perform status update on the created target asset object, to perform permission authentication on the user, the node device can further perform permission authentication on the user by invoking the authentication program stated in the smart contract object based on an invoking address of the smart contract object corresponding to the target asset object, and determine that the user has update permission for the target asset object if authentication succeeds.

It is worthwhile to note that authentication logic in the authentication program that is used to verify whether the user has update permission for the target asset object is not limited in the present specification, and can be customized by a person of ordinary skill in the art based on actual service demands in actual applications.

For example, the authentication logic in the authentication program can be verifying whether an identity of a publisher of the transaction submitted in the transaction matches a particular coding rule. The previous example is merely an example, and is not used for limitation.

In an implementation, a user list of member users with update permission for the target asset object can be stated in the smart contract object. The member users in the user list can include the publisher of the smart contract object, or does not include the publisher of the smart contract object.

In this case, when executing the transaction that is initiated by the user to perform status update on the created target asset object, to perform permission authentication on the user, the node device can further verify whether the user matches a member user in the user list, and determine that the user has update permission for the target asset object if the user matches a member user in the user list.

In an implementation, the user list of the member users with update permission for the target asset object that is stated in the smart contract object can be a public key list of publishers of the smart contract object. The user list can include information about public keys held by member users who have update permission and are designated by the publishers of the smart contract object.

In this case, when matching the user with a member user in the user list, the node device can perform authentication on a signature of the transaction based on the public key in the public key list. If authentication succeeds, the user matches a member user in the user list, and the user has update permission for the target asset object.

In the present specification, if the user has update permission for the target asset object, status update can be performed on the target asset object by invoking, based on an invoking address of the smart contract object corresponding to the target asset object, an execution program in the smart contract object that is used to perform status update on the target asset object.

It is worthwhile to note that in the present specification, during status update of the target asset object, a storage field in the target asset object is modified by using the execution program in the smart contract object that is used to perform status update on the target asset object, and status update information of the target asset object is added to the storage field in the target asset object.

For example, the target asset object is a digital asset converted from a loan contract. An asset status in the storage field in the target asset object can usually be loan performance status information indicating whether a borrower has made a repayment or breached a contract. In this case, the status update information can be a latest performance status of the borrower. During status update of the target asset object, the latest performance status of the borrower can be added to the storage field in the target asset object. For example, the storage field can include some flag bits for recording an asset status. When the flag bit is 1, the user has made a repayment on time, or when the flag bit is 0, the contract is breached. The value of the flag bit in the storage field can be updated during update of the storage field.

The status update information of the target asset object can be maintained and provided by the publisher of the smart contract object. In other words, the asset object can be a digital asset converted from an offline asset that is held by the publisher, and an asset status of the asset object is still maintained by the original publisher. After the asset object is transferred, and a holder of the asset object changes for a plurality of times, the status update on the asset object is still performed based on the asset status information maintained by the original publisher.

For example, if the publisher of the smart contract object updates the target asset object by default in the first case described, the publisher maintains the latest status update information. After detecting a status change of the target asset object, the publisher can use the latest status update information of the asset maintained by the publisher as an update parameter, and directly add the update parameter to a transaction for updating the target asset object.

In another implementation, if another authorized user who is designated in the smart contract object performs status update on the target asset object by default in the first case described, the user can query the latest status update information of the target asset object from the publisher of the smart contract object, or the publisher of the smart contract object publishes the latest status update information of the target asset object to members in the blockchain. After obtaining the latest status update information, the user can use the latest status update information as an update parameter, and directly add the update parameter to a transaction for updating the target asset object. Or the status update information is not added to the transaction. In this case, when status update is performed on the target asset object by invoking the execution program stated in the smart contract object, the latest status update information is queried from the publisher of the smart contract object, or the latest status update information published by the publisher of the smart contract object is read from the blockchain.

It can be seen from the previous implementations that the target member in the blockchain can publish, in the blockchain, the smart contract object used to manage the target asset object. When receiving the status update request initiated by the target user for the target asset object, the node device in the blockchain can verify whether the target user is a member user with update permission for the target asset object in the smart contract object, or verify whether the target user is a publisher of the smart contract object. The node device can complete status update of the target asset object by invoking the smart contract object if the target user is a member user with update permission in the smart contract object, or a publisher of the smart contract object. Therefore, the status update permission for the target asset object published in the blockchain can be strictly controlled, so that the status update permission is granted to the publishers of the smart contract objects, or a user group stated by the publisher can update the target asset object. As such, when an asset object is transferred, and a holder of the asset object changes for a plurality of times (for example, asset transfer and sale between different financial institutions), some new holders without update permission cannot perform improper status updates on the asset object, thereby improving the security level for asset object management.

Figure 3:
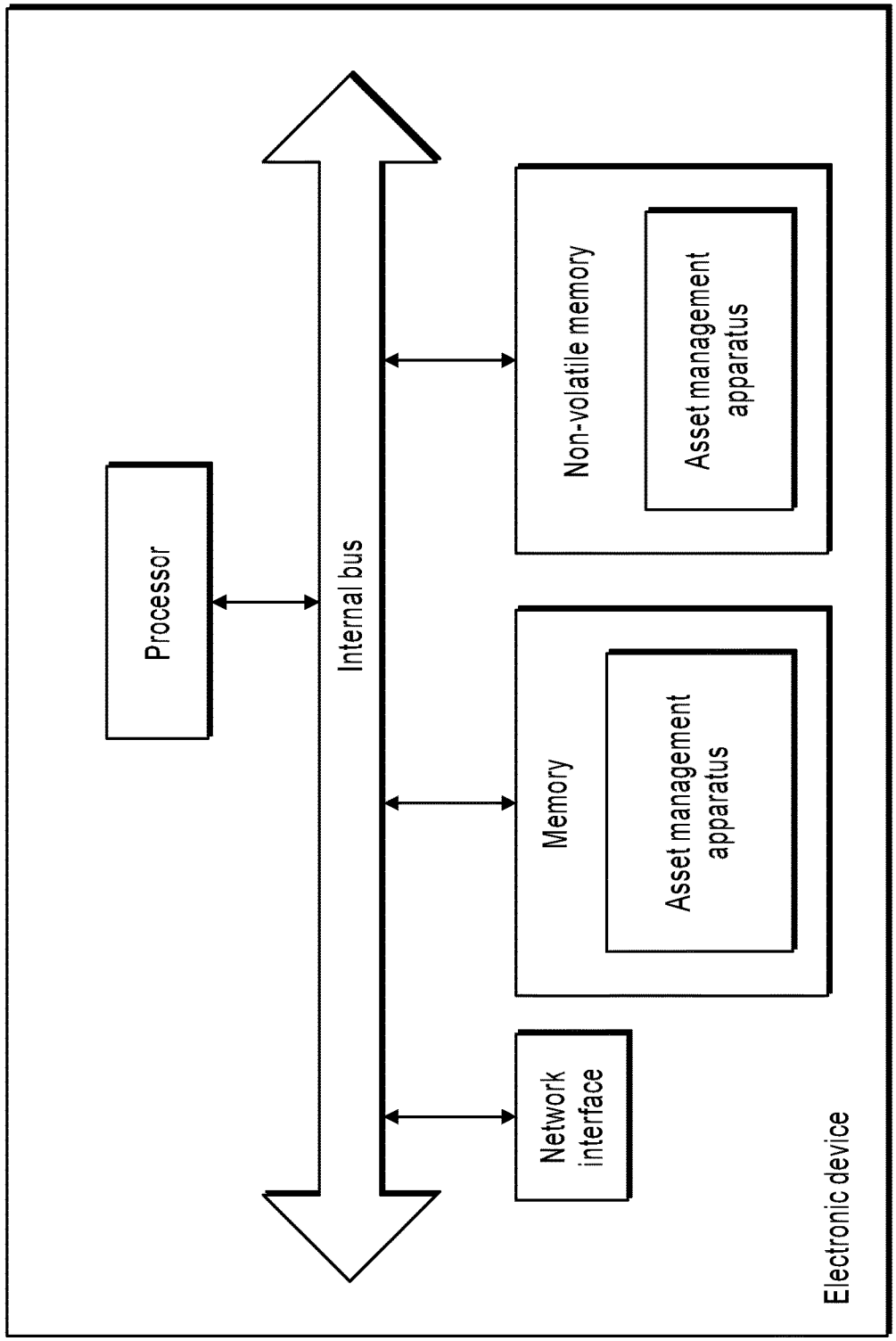
FIG. 3 is a schematic structural diagram illustrating an electronic device, according to an example implementation.

Corresponding to the method implementations, the present specification further provides an implementation of an asset management apparatus. The implementation of the asset management apparatus in the present specification can be applied to an electronic device. The apparatus implementation can be implemented by software, or can be implemented by hardware, or by a combination of software and hardware. In an example of software implementation, a logical apparatus is formed in the following way: A processor of an electronic device where the apparatus is located reads a corresponding computer program instruction from a non-volatile memory to a memory, and the computer program instruction runs to form the apparatus. In terms of hardware, FIG. 3 is a structural diagram illustrating hardware of an electronic device where the asset management apparatus in the present specification is located. In addition to a processor, a memory, a network interface, and a non-volatile memory shown in FIG. 3, the electronic device where the apparatus is located in this implementation can usually include other hardware based on actual functions of the electronic device. Details are omitted here for simplicity.

Figure 4:
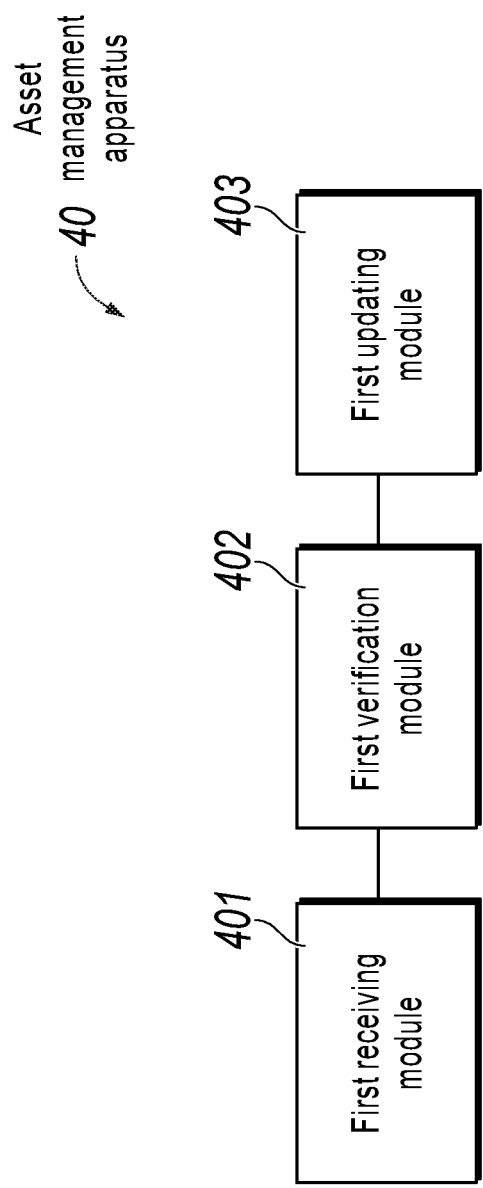
FIG. 4 is a block diagram illustrating an asset management apparatus, according to an example implementation.

FIG. 4 is a block diagram illustrating an asset management apparatus, according to an example implementation of the present specification.

Referring to FIG. 4, the asset management apparatus 40 can be applied to the electronic device shown in FIG. 3, and includes a first receiving module 401, a first verification module 402, and a first updating module 403.

The first receiving module 401 is configured to receive a status update request initiated by a target user for a target asset object.

The first verification module 402 is configured to verify, in response to the status update request, whether the target user is a member user with update permission for the target asset object in a smart contract object that is published in a blockchain and corresponds to an asset type of the target asset object, where the target asset object is created by invoking the smart contract object.

The first updating module 403 is configured to perform status update on the target asset object by invoking the smart contract object if the target user is a member user with update permission for the target asset object in the smart contract object.

In this implementation, an authentication program corresponding to the update permission for the target asset object is stated in the smart contract object; and the first verification module 402 is configured to perform permission authentication on the target user by invoking the authentication program stated in the smart contract object corresponding to the asset type of the target asset object, and determine that the target user is a member user with update permission for the target asset object if permission authentication succeeds.

In this implementation, a user list of member users with update permission for the target asset object is stated in the smart contract object; and the first verification module 402 is further configured to verify whether the target user matches a member user in the user list, and determine that the target user is a member user with update permission for the target asset object if the target user matches a member user in the user list.

In this implementation, the user list is a public key list of the member users with update permission for the target asset object, and the status update request is signed by the target user based on a held private key; and the first verification module 402 is further configured to perform authentication on a signature of the status update request based on a public key in the public key list, and determine that the target user matches a member user in the user list if authentication succeeds.

In this implementation, an execution program used to perform status update on the target asset object is stated in the smart contract object; and the first updating module 403 is configured to perform status update on the target asset object by invoking the execution program stated in the smart contract object.

In this implementation, objects supported by the blockchain include an account object, a smart contract object, and an asset object, the object supported by the blockchain includes a status field, and the status field is used to maintain status information of the object; and the first updating module 403 is further configured to perform status update on the target asset object by invoking the execution program stated in the smart contract object and adding status information of the target asset object that is included in the status update request to a status field in the target asset object.

Figure 5:
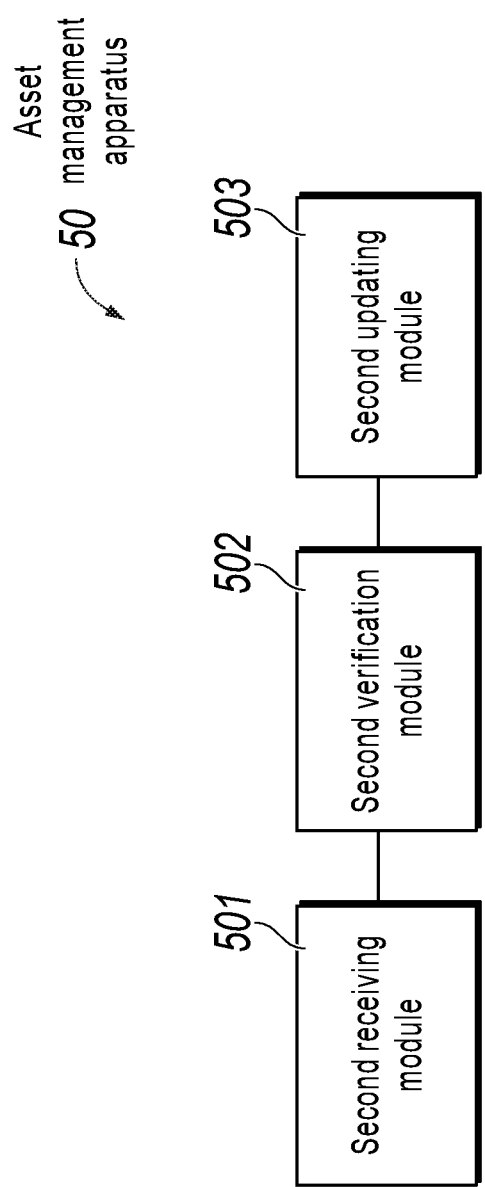
FIG. 5 is a block diagram illustrating another asset management apparatus, according to an example implementation.

FIG. 5 is a block diagram illustrating another asset management apparatus, according to an example implementation of the present specification.

Referring to FIG. 5, the asset management apparatus 50 can also be applied to the electronic device shown in FIG. 3, and includes a second receiving module 501, a second verification module 502, and a second updating module 503.

The second receiving module 501 is configured to receive a status update request initiated by a target user for a target asset object.

The second verification module 502 is configured to verify, in response to the status update request, whether the target user is a publisher of a smart contract object that is published in a blockchain and corresponds to an asset type of the target asset object. The target asset object is created by invoking the smart contract object.

The second updating module 503 is configured to perform status update on the target asset object by invoking the smart contract object if the target user is a member user who publishes the smart contract object.

In this implementation, an authentication program corresponding to a publisher identity of the smart contract object is stated in the smart contract object; and the second verification module 502 is configured to perform identity authentication on the target user by invoking the authentication program stated in the smart contract object corresponding to the asset type of the target asset object, and determine that the target user is a publisher of the smart contract object if identity authentication succeeds.

In this implementation, a user list of publishers of the smart contract object is stated in the smart contract object; and the second verification module 502 is further configured to verify whether the target user matches a member user in the user list, and determine that the target user is a publisher of the smart contract object if the target user matches a member user in the user list.

In this implementation, the user list is a public key list of the publishers of the smart contract object, and the status update request is signed by the target user based on a held private key; and the second verification module 502 is further configured to perform authentication on a signature of the status update request based on a public key in the public key list, and determine that the target user matches a member user in the user list if authentication succeeds.

In this implementation, an execution program used to perform status update on the target asset object is stated in the smart contract object; and the second updating module 503 is further configured to perform status update on the target asset object by invoking the execution program stated in the smart contract object.

In this implementation, objects supported by the blockchain include an account object, a smart contract object, and an asset object, the object supported by the blockchain includes a status field, and the status field is used to maintain status information of the object; and the second updating module 503 is configured to invoke the execution program stated in the smart contract object, and add status update information of the target asset object to a status field in the target asset object.

For specific implementation processes of functions and roles of the modules in the apparatus, references can be made to implementation processes of corresponding steps in the previous methods. Details are omitted here for simplicity.

Because the apparatus implementations basically correspond to the method implementations, for related parts, references can be made to the descriptions in the method implementations. The previous apparatus implementations are merely examples. The modules described as separate components may or may not be physically separate, and components displayed as modules may or may not be physical modules, and can be located in one position, or can be distributed on a plurality of network modules. Some or all of the modules can be selected based on actual demands to achieve the objectives of the solutions of the present specification. A person of ordinary skill in the art can understand and implement the implementations of the present specification without creative efforts.

The system, apparatus, and module described in the previous implementations can be implemented by a computer chip or an entity, or implemented by a product with a particular function. Typically, they can be implemented by a computer. A specific form of the computer can be a personal computer, a laptop computer, a cellular phone, a camera phone, a smartphone, a personal digital assistant, a media player, a navigation device, an email transceiver device, a game console, a tablet computer, a wearable device, or a combination of some of these devices.

Corresponding to the method implementations, the present specification further provides an implementation of an electronic device. The electronic device includes a processor and a memory configured to store a machine executable instruction. The processor and the memory are usually connected to each other by using an internal bus. In other possible implementations, the device can further include an external interface for communicating with another device or component.

In this implementation, by reading and executing the machine executable instruction that is stored in the memory and corresponds to control logic of asset management, the processor performs the following operations: receiving a status update request initiated by a target user for a target asset object; in response to the status update request, verifying whether the target user is a member user with update permission for the target asset object in a smart contract object that is published in a blockchain and corresponds to an asset type of the target asset object, where the target asset object is created by invoking the smart contract object; and performing status update on the target asset object by invoking the smart contract object if the target user is a member user with update permission for the target asset object in the smart contract object.

In this implementation, an authentication program corresponding to the update permission for the target asset object is stated in the smart contract object; and by reading and executing the machine executable instruction that is stored in the memory and corresponds to the control logic of asset management, the processor further performs the following operations: performing permission authentication on the target user by invoking the authentication program stated in the smart contract object corresponding to the asset type of the target asset object, and determining that the target user is a member user with update permission for the target asset object if permission authentication succeeds.

In this implementation, a user list of member users with update permission for the target asset object is stated in the smart contract object; and by reading and executing the machine executable instruction that is stored in the memory and corresponds to the control logic of asset management, the processor further performs the following operations: verifying whether the target user matches a member user in the user list, and determining that the target user is a member user with update permission for the target asset object if the target user matches a member user in the user list.

In this implementation, the user list is a public key list of the member users with update permission for the target asset object, and the status update request is signed by the target user based on a held private key; and by reading and executing the machine executable instruction that is stored in the memory and corresponds to the control logic of asset management, the processor further performs the following operations: performing authentication on a signature of the status update request based on a public key in the public key list, and determining that the target user matches a member user in the user list if authentication succeeds.

In this implementation, an execution program used to perform status update on the target asset object is stated in the smart contract object; and by reading and executing the machine executable instruction that is stored in the memory and corresponds to the control logic of asset management, the processor further performs the following operation: performing status update on the target asset object by invoking the execution program stated in the smart contract object.

In this implementation, objects supported by the blockchain include an account object, a smart contract object, and an asset object, the object supported by the blockchain includes a status field, and the status field is used to maintain status information of the object; and by reading and executing the machine executable instruction that is stored in the memory and corresponds to the control logic of asset management, the processor further performs the following operation: performing status update on the target asset object by invoking the execution program stated in the smart contract object and adding status information of the target asset object that is included in the status update request to a status field in the target asset object.

Corresponding to the method implementations, the present specification further provides an implementation of another electronic device. The electronic device includes a processor and a memory configured to store a machine executable instruction. The processor and the memory are usually connected to each other by using an internal bus. In other possible implementations, the device can further include an external interface for communicating with another device or component.

In this implementation, by reading and executing the machine executable instruction that is stored in the memory and corresponds to control logic of asset management, the processor performs the following operations: receiving a status update request initiated by a target user for a target asset object; in response to the status update request, verifying whether the target user is a publisher of a smart contract object that is published in a blockchain and corresponds to an asset type of the target asset object, where the target asset object is created by invoking the smart contract object; and performing status update on the target asset object by invoking the smart contract object if the target user is a member user who publishes the smart contract object.

In this implementation, an authentication program corresponding to a publisher identity of the smart contract object is stated in the smart contract object; and by reading and executing the machine executable instruction that is stored in the memory and corresponds to the control logic of asset management, the processor further performs the following operations: performing identity authentication on the target user by invoking the authentication program stated in the smart contract object corresponding to the asset type of the target asset object, and determining that the target user is a publisher of the smart contract object if identity authentication succeeds.

In this implementation, a user list of publishers of the smart contract object is stated in the smart contract object; and by reading and executing the machine executable instruction that is stored in the memory and corresponds to the control logic of asset management, the processor further performs the following operations: verifying whether the target user matches a member user in the user list, and determining that the target user is a publisher of the smart contract object if the target user matches a member user in the user list.

In this implementation, the user list is a public key list of the publishers of the smart contract object, and the status update request is signed by the target user based on a held private key; and by reading and executing the machine executable instruction that is stored in the memory and corresponds to the control logic of asset management, the processor further performs the following operations: performing authentication on a signature of the status update request based on a public key in the public key list, and determining that the target user matches a member user in the user list if authentication succeeds.

In this implementation, an execution program used to perform status update on the target asset object is stated in the smart contract object; and by reading and executing the machine executable instruction that is stored in the memory and corresponds to the control logic of asset management, the processor further performs the following operation: performing status update on the target asset object by invoking the execution program stated in the smart contract object.

In this implementation, objects supported by the blockchain include an account object, a smart contract object, and an asset object, the object supported by the blockchain includes a status field, and the status field is used to maintain status information of the object; and by reading and executing the machine executable instruction that is stored in the memory and corresponds to the control logic of asset management, the processor further performs the following operations: invoking the execution program stated in the smart contract object, and adding status update information of the target asset object to a status field in the target asset object.

A person of ordinary skill in the art can easily figure out another implementation solution of the present specification after considering the present specification and practicing the present disclosure. The present specification is intended to cover any variations, functions, or adaptive changes of the present specification. These variations, functions, or adaptive changes comply with general principles of the present specification, and include common knowledge or a commonly used technical means in the technical field that is not disclosed in the present specification. The present specification and the implementations are merely considered as examples, and the actual scope and spirit of the present specification are pointed out by the following claims.

It should be understood that the present specification is not limited to the previous accurate structures shown in the accompanying drawings, and modifications and changes can be made without departing from the scope of the present specification. The scope of the present specification is limited only by the appended claims.

The previous descriptions are merely example implementations of the present specification, but are not intended to limit the present specification. Any modification, equivalent replacement, or improvement made without departing from the spirit and principle of the present specification should fall within the protection scope of the present specification.

Figure 6:
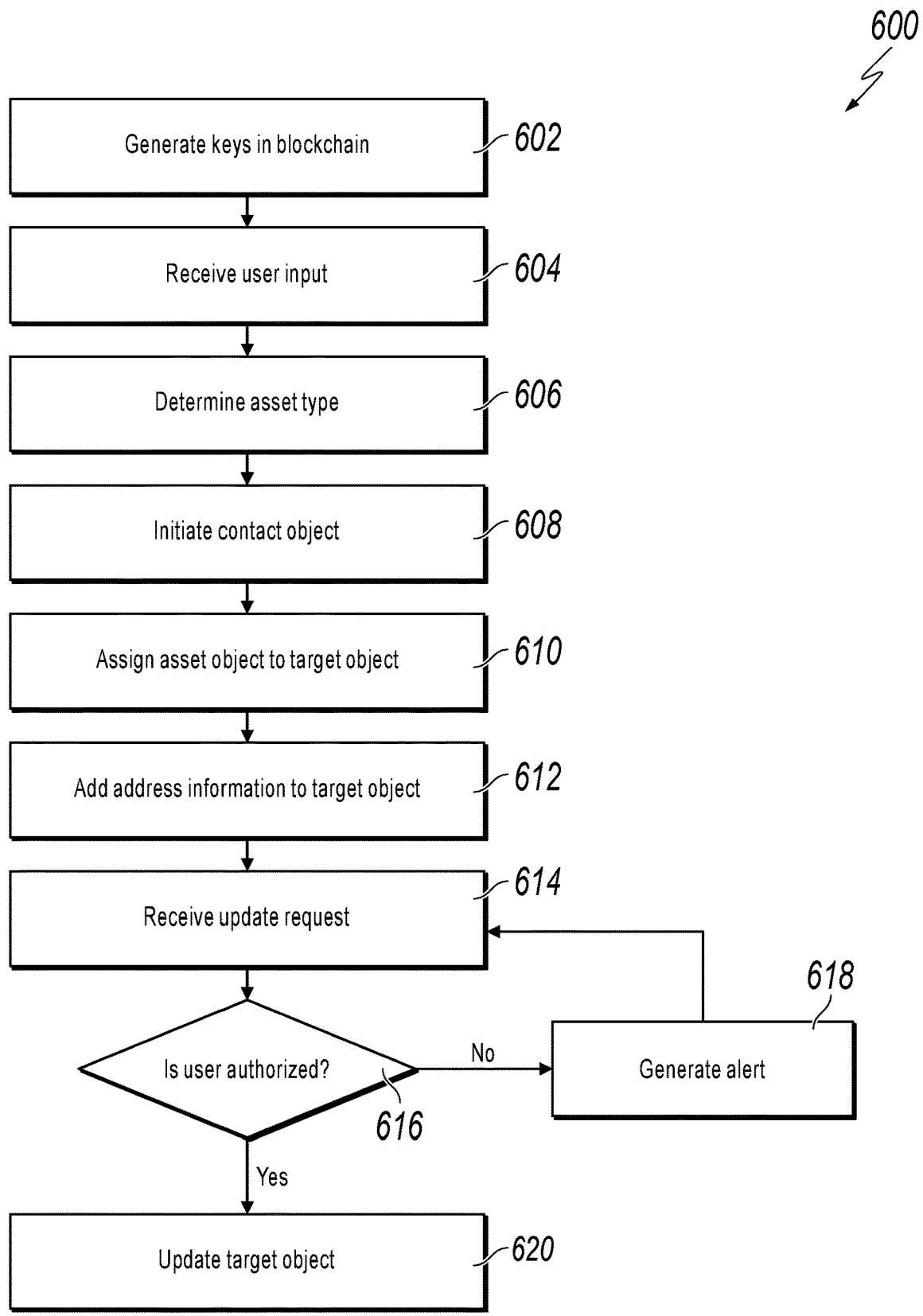
FIG. 6 is a flowchart illustrating an example of a computer-implemented method for asset management, according to an implementation of the present disclosure.

FIG. 6 is a flowchart illustrating an example of a computer-implemented method 600 for management of assets in a blockchain, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, keys are generated for a target user recorded in a distributed database of the blockchain network. The keys include a public key and a private key. In some implementations, the public key is associated with an account address of an institution in the blockchain. The private key can be configured to be used by the institution to operate the account. In some implementations, the blockchain network includes a consortium chain. The target member (user) in the blockchain network is a consortium member that has asset object generation and/or update authority in the consortium chain. The blockchain network includes one or more account objects and one or more contract objects. The objects of the blockchain network (e.g., account objects, contract objects, target objects, and asset objects) include one or more fields. For example, the fields can include one or more of the following: the IP configuration for the target user; DNS logs from the target user, including events such as DNS lookups, changes to DNS settings, and so forth; network firewall logs (and/or other security-related log files) from the target user, including events such as blocked or allowed network communications, and so forth; operating system (OS) logs from the target user, including events associated with the OS; port settings on the target user; user access logs from the target user, including successful and/or unsuccessful user attempts to transfer assets from or to the target user; and/or user privilege data from the target user, including particular access privileges for various users on the target user. The fields can also include one or more of an entity name, entity ID, target user ID, OS version information, and software version(s) for installed software, network router information, other DNS settings, firewall settings, port settings, IP whitelist and/or blacklist settings, and so forth. From 602, method 600 proceeds to 604.

At 604, a user input is received from the target user recorded in a distributed database of the blockchain network. The user input includes a request to generate an asset object in the blockchain network. The asset object includes a digital asset corresponding to a physical asset associated with the target user. The request includes an asset type specified by the target user. The asset type can be indicated by an identifier that corresponds one of a plurality of different types of asset objects that can be deployed in the consortium chain. From 604, method 600 proceeds to 606.

At 606, an asset type of the asset object is determined based on the user input. From 606, method 600 proceeds to 608.

At 608, the contract object is initiated in the blockchain network to generate the asset object based on the asset type. The asset object includes a digital asset corresponding to a physical asset associated with the target user. From 608, method 600 proceeds to 610.

At 610, the asset object is assigned to a target object of the target user. The target object includes an address field used to maintain address information of the asset object assigned to the target object. From 610, method 600 proceeds to 612.

At 612, the address information of the asset object is added to the target object. From 612, method 600 proceeds to 614.

At 614, a request to update a status of the target object is received from the target user. The status of the target object can be stored in the storage field of the target object. The status of the target object can include a loan performance status information indicating whether a borrower has made a repayment or breached a contract. The status update information can include status of a most recent performance of the target user (e.g., borrower). During status update of the target object, the latest performance status of the target user can be added to the storage field in the target object. For example, the storage field can include a flag (e.g., a binary flag) for recording the status of the target object. A binary flag with a value of "1" can indicate that the target user has performed a required operation associated with the asset object, such as a (regularly occurring) payment on time. A binary flag with a value of "0" can indicate that the contract is breached (e.g., a required operation has not been performed by a deadline). The value of the flag in the storage field can be updated using the contract object during an update process. From 614, method 600 proceeds to 616.

At 616, a determination is made as to whether the target user has the authority to update the asset object. In some implementations, contract object includes a list of target users who are authorized to update each target object in the blockchain network. The determination can include operations of reading and executing a machine executable instruction that is stored in the contract object and corresponds to the control logic of asset management. For example, the determination can include: verifying whether the target user matches a member user in the user list, and determining that the target user is a manager of the contract object if the target user matches a member user in the user list. In some implementations, the user list is a public key list of the managers of the contract object. The status update request can be signed by the target user by using the corresponding private key. The determination can include operations of: performing authentication of the signature of the status update request based on a public key in the public key list, and determining that the target user matches a member user in the user list if authentication succeeds. If it is determined that the target user does not have the authority to update the status of the asset object, method 600 proceeds to 618. At 618, an alert is generated to indicate that the target user does not have the authority to update the status of the asset object. From 618, method 600 returns to 614.

Otherwise, at 620, if it is determined that the target user has the authority to update the status of the asset object, the status of the asset object is updated. For example, the value of the binary flag is switched from "0" to "1" to indicate that the authorized target user has performed a required operation associated with the asset object, such as a (regularly occurring) payment on time. After 620, method 600 can stop or returns to 614.

Implementations of the present application can solve technical problems in managing assets in a blockchain. In some implementations, the blockchain is a distributed storage solution that provides immutable and tamper-resistant data transfer and storage, and the data is stored in a database of the blockchain in an encrypted form. Such security measures ensure that that system state data stored on the blockchain is not corrupted or altered by malicious processes. For example, an alteration of an asset-receiving object can be a tactic used by an attacker when a target user is compromised for fraudulent purposes, and storage of system state data on an immutable blockchain prevents the use of that tactic by an attacker. In some implementations, the blockchain headers from different payment applications across entities are cross-Merkelized or otherwise processed on the blockchain to further ensure the integrity of the data stored in the database of the blockchain.

In consideration of security and confidentiality, contract objects can be configured to perform privacy protection processing on the data associated with the asset object before generating the asset object and sending the address information to other platforms for processing. In addition, the asset transfer operation is configured such that it does not affect the overall data volume within the blockchain by deleting a data volume from a first location when adding the corresponding data volume in a second location. As such, the asset transfer operation does not lead to an exponential increase of data volume, which is a common problem associated with conventional methods of asset management.

Implementations of the present application provide methods and apparatuses for improving asset management. In some implementations, a processing platform (e.g., an payment processing server) obtains data that is to be validated and that corresponds to a predetermined feature from a data providing platform as a data group that is to be validated (e.g., a data group that corresponds to user transaction amounts). In addition, the processing platform can further obtain additional (e.g., historical) data associated with the asset that is to be validated by the predetermined transfer rule. The historical data may also corresponds to the same predetermined feature, and the comparison data group can be provided to a processing platform (e.g., a node of the blockchain network) for processing before the asset transfer. Then, the processing platform determines whether the asset transfer request satisfies the predetermined transfer rule. If the predetermined transfer rule is satisfied (e.g., there is no abnormal data), the processing platform can continue to transfer the asset. If the processing platform determines that there is abnormal data, the processing platform can start alerting, instruct related persons to analyze the cause of the data exception, and trigger related solutions.

In some implementations, the processing platform determines risk scores of asset transfers and transactions across multiple different entities, based on both transaction data for the transaction and system state data for the hosts involved in handling the transaction. The risk scores are examined to identify those transactions that are deemed high risk, with above-threshold scores. Such transactions can be blocked or queued for further examination in a case management system, for example. The system state data to be used for comparison, as well as the transaction data and risk score(s), can be stored on the blockchain that provides immutable, secure, and distributed data storage. Use of the blockchain facilitates the collection and analysis of a large amount of transaction data and system state data, which may grow over time as transaction traffic increases and/or transaction networks expand by adding more hosts to accommodate the increased traffic. Accordingly, through the use of a blockchain to store and analyze the data, implementations provide scalability with respect to the data extraction, analysis, and storage of the data. Moreover, because the blockchain is distributed across multiple network locations, implementations avoid the use of a centralized database for data storage and are therefore less vulnerable to corruption or deletion by malicious processes, in comparison to traditional, previously available risk analysis solutions that are vulnerable to attack at such a centralized storage hub Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for asset management, the computer-implemented method comprising:
    receiving, from a target user having an account recorded in a distributed database of a blockchain network, a user input comprising a request to update a status of a target object that was transferred among a plurality of holders, the request being signed by the target user using a private key;
    determining a contract object associated with the target object, the contract object being published in the blockchain network and corresponding to an asset type of the target object, wherein the target object was created using the contract object, and wherein the contract object comprises a list of member users with an update permission for the target object and information about public keys held by the member users;
    performing an identity authentication of the target user based on a respective public key corresponding to the private key used for signing the request;
    in response to a successful identity authentication of the target user, determining, based on the contract object, that the target user is a current holder of the target object and is included in the list of member users with the update permission for the target object; and
    in response to determining that the target user has the update permission for the target object, performing a status update on the target object by invoking the contract object.

2. The computer-implemented method of claim 1, wherein performing the identity authentication of the target user comprises executing an authentication program corresponding to the update permission for the target object.

3. The computer-implemented method of claim 1, wherein the contract object comprises a whitelist of target objects authorized to hold an asset object created by invoking the contract object.

4. The computer-implemented method of claim 1, wherein the contract object comprises a code field that is used to maintain an execution code related to an execution program.

5. The computer-implemented method of claim 1, wherein the blockchain network comprises a consortium chain, and the target user in the blockchain network is a consortium member that has asset object generation authority in the consortium chain.

6. The computer-implemented method of claim 1, wherein the status of the target object comprises a flag indicating a performance of the target user.

7. The computer-implemented method of claim 1, further comprising generating for the target user a public key associated with an account address of an institution in the blockchain network and a private key configured to be used by the institution to operate an account corresponding to the account address.

8. A non-transitory, computer-readable medium storing one or more instructions executable by a computer system to perform operations comprising:
   receiving, from a target user having an account recorded in a distributed database of a blockchain network, a user input comprising a request to update a status of a target object that was transferred among a plurality of holders, the request being signed by the target user using a private key;
   determining a contract object associated with the target object, the contract object being published in the blockchain network and corresponding to an asset type of the target object, wherein the target object was created using the contract object, and wherein the contract object comprises a list of member users with an update permission for the target object and information about public keys held by the member users;
   performing an identity authentication of the target user based on a respective public key corresponding to the private key used for signing the request;
   in response to a successful identity authentication of the target user, determining, based on the contract object, that the target user is a current holder of the target object and is included in the list of member users with the update permission for the target object; and
   in response to determining that the target user has the update permission for the target object, performing a status update on the target object by invoking the contract object.

9. The non-transitory, computer-readable medium of claim 8, wherein performing the identity authentication of the target user comprises executing an authentication program corresponding to the update permission for the target object.

10. The non-transitory, computer-readable medium of claim 8, wherein the contract object comprises a whitelist of target objects authorized to hold an asset object created by invoking the contract object.

11. The non-transitory, computer-readable medium of claim 8, wherein the contract object comprises a code field that is used to maintain an execution code related to an execution program.

12. The non-transitory, computer-readable medium of claim 8, wherein the blockchain network comprises a consortium chain, and the target user in the blockchain network is a consortium member that has asset object generation authority in the consortium chain.

13. The non-transitory, computer-readable medium of claim 8, wherein the status of the target object comprises a flag indicating a performance of the target user.

14. The non-transitory, computer-readable medium of claim 8, wherein the operations further comprise generating for the target user a public key associated with an account address of an institution in the blockchain network and a private key configured to be used by the institution to operate an account corresponding to the account address.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform operations comprising:
      receiving, from a target user having an account recorded in a distributed database of a blockchain network, a user input comprising a request to update a status of a target object that was transferred among a plurality of holders, the request being signed by the target user using a private key;
      determining a contract object associated with the target object, the contract object being published in the blockchain network and corresponding to an asset type of the target object, wherein the target object was created using the contract object, and wherein the contract object comprises a list of member users with an update permission for the target object and information about public keys held by the member users;
      performing an identity authentication of the target user based on a respective public key corresponding to the private key used for signing the request;
      in response to a successful identity authentication of the target user, determining, based on the contract object, that the target user is a current holder of the target object and is included in the list of member users with the update permission for the target object; and
      in response to determining that the target user has the update permission for the target object, performing a status update on the target object by invoking the contract object.

16. The computer-implemented system of claim 15, wherein performing the identity authentication of the target user comprises executing an authentication program corresponding to the update permission for the target object.

17. The computer-implemented system of claim 15, wherein the contract object comprises a whitelist of target objects authorized to hold an asset object created by invoking the contract object.

18. The computer-implemented system of claim 15, wherein the contract object comprises a code field that is used to maintain an execution code related to an execution program.

19. The computer-implemented system of claim 15, wherein the blockchain network comprises a consortium chain, and the target user in the blockchain network is a consortium member that has asset object generation authority in the consortium chain.

20. The computer-implemented system of claim 15, wherein the status of the target object comprises a flag indicating a performance of the target user.

* * * * *